(12) United States Patent
Kamiya

(10) Patent No.: US 10,093,769 B2
(45) Date of Patent: Oct. 9, 2018

(54) ALUMINUM CHELATE-BASED LATENT CURING AGENT, METHOD OF PRODUCING SAME, AND THERMOSETTING EPOXY RESIN

(71) Applicant: DEXERIALS CORPORATION, Tokyo (JP)

(72) Inventor: Kazunobu Kamiya, Shimotsuga-gun (JP)

(73) Assignee: DEXERIALS CORPORATION, Tokyo (JP)

( * ) Notice: Subject to any disclaimer, the term of this patent is extended or adjusted under 35 U.S.C. 154(b) by 50 days.

(21) Appl. No.: 15/509,025

(22) PCT Filed: Aug. 31, 2015

(86) PCT No.: PCT/JP2015/074610
§ 371 (c)(1),
(2) Date: Mar. 6, 2017

(87) PCT Pub. No.: WO2016/039193
PCT Pub. Date: Mar. 17, 2016

(65) Prior Publication Data
US 2017/0253694 A1    Sep. 7, 2017

(30) Foreign Application Priority Data
Sep. 9, 2014 (JP) ................................. 2014-183374

(51) Int. Cl.
C08G 18/00    (2006.01)
C08G 59/70    (2006.01)
(Continued)

(52) U.S. Cl.
CPC ........... *C08G 59/70* (2013.01); *C08G 59/188* (2013.01); *C08G 59/245* (2013.01); *C08K 5/5415* (2013.01)

(58) Field of Classification Search
CPC .... C08G 59/70; C08G 59/188; C08G 59/245; C08K 5/5415
(Continued)

(56) References Cited

U.S. PATENT DOCUMENTS

2005/0107494 A1    5/2005    Matsushima et al.
2009/0275708 A1    11/2009    Kamiya
(Continued)

FOREIGN PATENT DOCUMENTS

JP    2002-212537 A    7/2002
JP    2003-238656 A    8/2003
(Continued)

OTHER PUBLICATIONS

Nov. 24, 2015 International Search Report issued in International Patent Application No. PCT/JP2015/074610.

*Primary Examiner* — David T Karst
(74) *Attorney, Agent, or Firm* — Oliff PLC

(57) ABSTRACT

An aluminum chelate-based latent curing agent for curing a thermosetting epoxy resin, in which an aluminum chelate-based curing agent is held in a porous resin obtained by, at the same time, subjecting a polyfunctional isocyanate compound to interfacial polymerization and subjecting a radical polymerizable compound to radical polymerization in the presence of a radical polymerization initiator, and the surface of the aluminum chelate-based latent curing agent has been subjected to inactivation treatment with an alkoxysilane coupling agent. An alkylalkoxysilane is preferred as the alkoxysilane coupling agent. The radical polymerizable compound preferably contains a polyfunctional radical polymerizable compound.

14 Claims, 3 Drawing Sheets

(51) Int. Cl.
    *C08G 59/18*     (2006.01)
    *C08G 59/24*     (2006.01)
    *C08K 5/5415*     (2006.01)

(58) Field of Classification Search
    USPC .......................................... 525/452; 528/87
    See application file for complete search history.

(56) References Cited

U.S. PATENT DOCUMENTS

| | | |
|---|---|---|
| 2010/0143604 A1 | 6/2010 | Matsushima et al. |
| 2010/0331435 A1 | 12/2010 | Kamiya |

FOREIGN PATENT DOCUMENTS

| | | |
|---|---|---|
| JP | 2008-031325 A | 2/2008 |
| JP | 2009-221465 A | 10/2009 |
| JP | 2010-168449 A | 8/2010 |
| JP | 2012-117033 A | 6/2012 |
| JP | 2012-188596 A | 10/2012 |
| JP | 2012-224869 A | 11/2012 |
| WO | 2007/007725 A1 | 1/2007 |

ALUMINUM CHELATE-BASED LATENT CURING AGENT, METHOD OF PRODUCING SAME, AND THERMOSETTING EPOXY RESIN

TECHNICAL FIELD

The present invention relates to an aluminum chelate-based latent curing agent in which an aluminum chelate-based curing agent is held in a porous resin, among curing agents for curing a thermosetting epoxy resin.

BACKGROUND ART

As a curing agent exhibiting low-temperature rapid-curing activity for an epoxy resin, an aluminum chelate-based latent curing agent in which an aluminum chelate-based curing agent is held in a porous resin particle obtained by subjecting a polyfunctional isocyanate compound to interfacial polymerization and subjecting a radical polymerizable compound to radical polymerization at the same time has been proposed (Patent Document 1).

CITATION LIST

Patent Literature

Patent Document 1: Japanese Unexamined Patent Application Publication No. 2009-221465A

SUMMARY OF INVENTION

Technical Problem

The aluminum chelate-based curing agent that is present on the surface of the particulate aluminum chelate-based latent curing agent disclosed in Patent Document 1 is inactivated by being reacted with water present during the interfacial polymerization of the polyfunctional isocyanate compound; however, not all of the aluminum chelate-based curing agent present on the surface is completely inactivated. Therefore, problems occur in that, although a one-component thermosetting epoxy resin composition in which such an aluminum chelate-based latent curing agent is blended with a general purpose glycidyl ether type epoxy resin exhibits a level of storage stability at room temperature (20 to 35° C.) that causes practically no problems, a one-component thermosetting epoxy resin composition in which such an aluminum chelate-based latent curing agent is blended with an alicyclic epoxy resin having extremely high cationic polymerizability exhibits insufficient storage stability at room temperature.

An object of the present invention is to solve the problems of conventional technologies described above, and is to provide an aluminum chelate-based latent curing agent that can exhibit excellent storage stability at room temperature without impairing rapid curability at low temperatures of a one-component thermosetting epoxy resin composition when the one-component thermosetting epoxy resin composition is prepared by blending the aluminum chelate-based latent curing agent, in which an aluminum chelate-based curing agent is held in a porous resin particle obtained by subjecting a polyfunctional isocyanate compound to interfacial polymerization and subjecting a radical polymerizable compound to radical polymerization at the same time, into an alicyclic epoxy resin having extremely high cationic polymerizability.

Solution to Problem

The inventor of the present invention has found that, by subjecting the surface of a particulate aluminum chelate-based latent curing agent to inactivation treatment with an alkoxysilane coupling agent, an aluminum chelate-based curing agent present on the surface can be almost completely inactivated. The inventor also has found that a one-component thermosetting epoxy resin composition, which is obtained by blending an aluminum chelate-based latent curing agent which has been subjected to surface inactivation treatment with an alkoxysilane coupling agent into an alicyclic epoxy resin having extremely high cationic polymerizability, exhibits excellent storage stability at room temperature without impairing rapid curability at low temperatures, and thus completed the present invention.

The present invention provides an aluminum chelate-based latent curing agent for curing a thermosetting epoxy resin, an aluminum chelate-based curing agent being held in a porous resin obtained by, at the same time, subjecting a polyfunctional isocyanate compound to interfacial polymerization and subjecting a radical polymerizable compound to radical polymerization in the presence of a radical polymerization initiator, and the surface of the aluminum chelate-based latent curing agent having been subjected to inactivation treatment with an alkoxysilane coupling agent.

Furthermore, the present invention provides a method of producing the aluminum chelate-based latent curing agent described above, the method including:

obtaining an oil phase by dissolving or dispersing an aluminum chelate-based curing agent, a polyfunctional isocyanate compound, a radical polymerizable compound, and a radical polymerization initiator in a volatile organic solvent, subjecting a polyfunctional isocyanate compound to interfacial polymerization and subjecting a radical polymerizable compound to a radical polymerization reaction at the same time by adding the obtained oil phase to an aqueous phase containing a dispersing agent while heating and stirring, and after an aluminum chelate-based curing agent is held in a porous resin obtained thereby, subjecting a surface thereof to inactivation treatment with an alkoxysilane coupling agent by immersing into a solution in which an alkoxysilane coupling agent is dissolved in an organic solvent.

Furthermore, the present invention provides a thermosetting epoxy resin composition containing the aluminum chelate-based latent curing agent described above, an epoxy resin, and a silane-based compound.

Advantageous Effects of Invention

In the aluminum chelate-based latent curing agent of the present invention, an aluminum chelate-based curing agent that can cure an epoxy resin is held in a porous resin obtained from a mixture of a polyfunctional isocyanate compound and a radical polymerizable compound by subjecting the polyfunctional isocyanate compound to interfacial polymerization and the radical polymerizable compound to radical polymerization at the same time. Because of this, the porous resin wall (microcapsule wall) becomes brittle. As a result, the aluminum chelate-based latent curing agent can exhibit sharp thermal responsiveness at low temperature regions. Furthermore, the surface of the particulate aluminum chelate-based latent curing agent has been subjected to inactivation treatment with an alkoxysilane coupling agent, and the aluminum chelate-based curing agent remained on the surface is inactivated. Because of this, a one-component thermosetting epoxy resin composition obtained by blending the aluminum chelate-based latent curing agent of the present invention into an alicyclic epoxy resin having extremely high cationic polymerizability can achieve excellent storage stability at room temperature.

DESCRIPTION OF EMBODIMENTS

Aluminum Chelate-Based Latent Curing Agent

Figure 1:
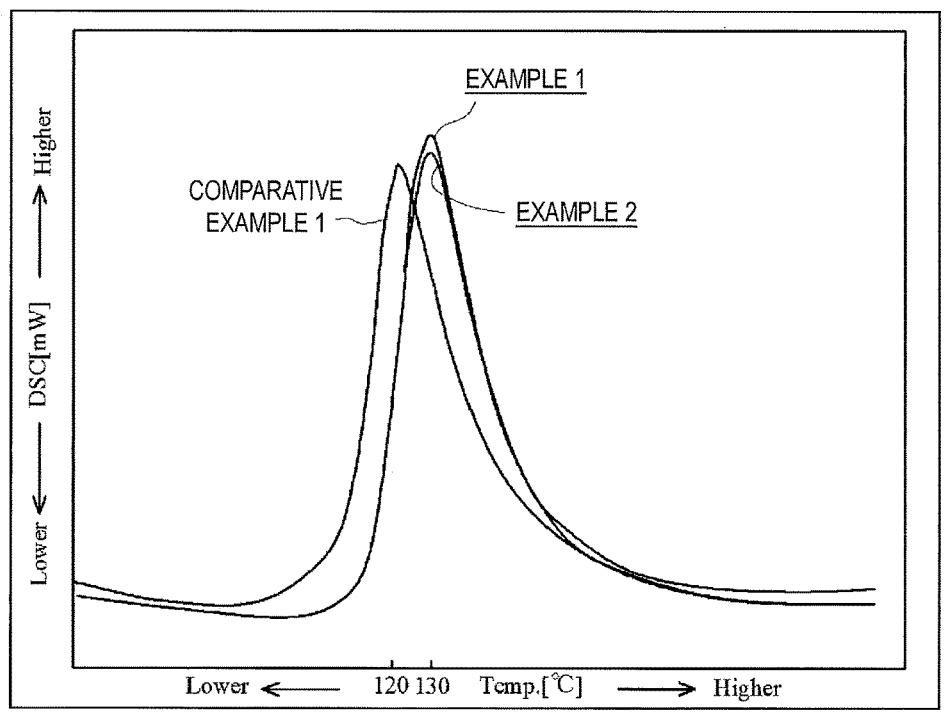
FIG. 1 is a DSC chart of thermosetting epoxy resin compositions containing the aluminum chelate-based latent curing agents of Examples 1 and 2 and Comparative Example 1.

In the aluminum chelate-based latent curing agent of the present invention, an aluminum chelate-based curing agent is held in a porous resin obtained by, at the same time, subjecting a polyfunctional isocyanate compound to interfacial polymerization and subjecting a radical polymerizable compound to radical polymerization in the presence of a radical polymerization initiator. More specifically, the aluminum chelate-based latent curing agent has a structure in which the aluminum chelate-based curing agent is held in multiple fine pores present in the porous resin matrix, but not a microcapsule having a simple structure in which the porous resin shell covers around a core of the aluminum chelate-based curing agent. Furthermore, the surface thereof has been subjected to inactivation treatment with an alkoxysilane coupling agent.

Since the aluminum chelate-based latent curing agent of the present invention is produced mainly by an interfacial polymerization method, the shape thereof is spherical. The particle size thereof is preferably from 0.5 to 100 μm from the perspectives of curability and dispersibility, and the size of the pores is preferably from 5 to 150 nm from the perspectives of curability and latency.

Furthermore, the latency of the aluminum chelate-based latent curing agent tends to decrease when the degree of crosslinking of the used porous resin is too small, and its thermal responsiveness tends to decrease when the degree of crosslinking is too large. A porous resin in which the degree of crosslinking is adjusted depending on the purpose of use is preferably used. Note that the degree of crosslinking of the porous resin can be measured by micro compression test.

The aluminum chelate-based latent curing agent contains substantially no organic solvent used during the interfacial polymerization, and specifically, the content is preferably 1 ppm or less from the perspective of curing stability.

Note that the aluminum chelate-based latent curing agent can be filtered and dried after immersing in an aluminum chelate-based curing agent solution having a high concentration to enhance the concentration of the aluminum chelate-based curing agent, prior to surface inactivation treatment.

Furthermore, the compounded amount of the aluminum chelate-based curing agent relative to the amount of the porous resin in the aluminum chelate-based latent curing agent is preferably from 10 to 200 parts by mass, and more preferably from 10 to 150 parts by mass, per 100 parts by mass total of the radical polymerizable compound and the polyfunctional isocyanate compound constituting the porous resin since the curability of the epoxy resin to be cured is reduced when the compounded amount of the aluminum chelate-based curing agent is too small and since the latency of the aluminum chelate-based latent curing agent is reduced when the compounded amount is too large.

Aluminum Chelate-Based Curing Agent

Furthermore, examples of the aluminum chelate-based curing agent constituting the aluminum chelate-based latent curing agent of the present invention include a complex compound in which three β-ketoenolate anions are coordinated to aluminum, represented by Formula (1).

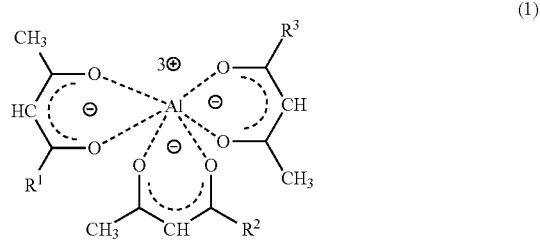

Note that $R^1$, $R^2$, and $R^3$ are each independently an alkyl group or an alkoxyl group. Examples of the alkyl group include a methyl group, an ethyl group, and the like. Examples of the alkoxyl group include a methoxy group, an ethoxy group, an oleyloxy group, and the like.

Specific examples of the aluminum chelate-based curing agent represented by Formula (1) include aluminum tris(acetylacetonate), aluminum tris(ethylacetoacetate), aluminum monoacetylacetonate bis(ethylacetoacetate), aluminum monoacetylacetonate bisoleylacetoacetate, ethylacetoacetate aluminum diisopropylate, alkyl acetoacetate aluminum diisopropylate, and the like.

Polyfunctional Isocyanate Compound

The polyfunctional isocyanate compound to constitute the porous resin is preferably a compound having two or more isocyanate groups, and more preferably having three isocyanate groups, in one molecule. Further preferable examples of such a trifunctional isocyanate compound include TMP adducts of Formula (2) in which 3 mol of diisocyanate compound is reacted with 1 mol of trimethylolpropane, isocyanurates of Formula (3) in which 3 mol of diisocyanate compound is self-condensed, and biurets of Formula (4) in which diisocyanate urea obtained from 2 mol, out of 3 mol, of the diisocyanate compound is condensed with the other 1 mol of diisocyanate.

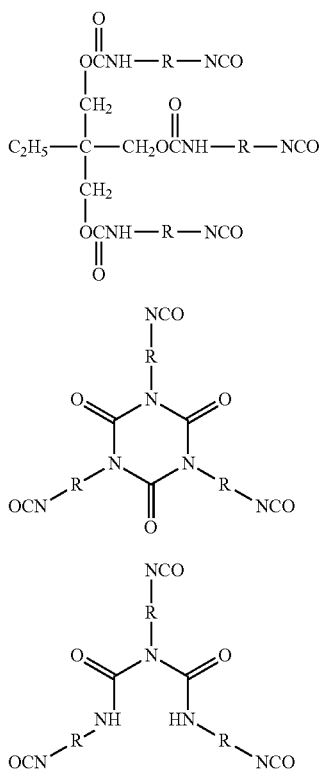

In Formulas (2) to (4) above, the substituent R is a moiety excluding an isocyanate group of a diisocyanate compound. Specific examples of such a diisocyanate compound include toluene 2,4-diisocyanate, toluene 2,6-diisocyanate, m-xylylene diisocyanate, hexamethylene diisocyanate, hexahydro-m-xylylene diisocyanate, isophorone diisocyanate, methylenediphenyl 4,4'-diisocyanate, and the like.

Radical Polymerizable Compound

Furthermore, the radical polymerizable compound, which is another component to constitute the porous resin, is radically polymerized at the same time with the interfacial polymerization of the polyfunctional isocyanate compound and enhances mechanical properties of the porous resin, which serves as a microcapsule wall. Because of this, thermal responsiveness during curing of the epoxy resin, in particular, sharp thermal responsiveness at low temperature regions, can be achieved. The reason of this is not clear; however, it is conceived that this is because the interfacial polymerization and the radical polymerization occur at the same time and phase separation structure is formed in the porous resin, thereby making the crosslinking density of the polyurea-urethane moiety smaller than that of the homopolymer system of the isocyanate compound.

Such a radical polymerizable compound has one or more carbon-carbon unsaturated bond in a molecule, and includes so-called monofunctional radical polymerizable compound and polyfunctional radical polymerizable compound; however, in the present invention, the radical polymerizable compound preferably contains a polyfunctional radical polymerizable compound. This is because sharp thermal responsiveness at low temperature regions can be achieved even more easily by using a polyfunctional radical polymerizable compound. Because of this, the radical polymerizable compound contains preferably at least 30 mass %, and more preferably at least 50 mass %, of the polyfunctional radical polymerizable compound.

Examples of the monofunctional radical polymerizable compound include monofunctional vinyl-based compounds, such as styrene and methylstyrene, monofunctional (meth) acrylate-based compounds, such as butyl acrylate, and the like. Examples of the polyfunctional radical polymerizable compound include polyfunctional vinyl-based compounds, such as divinylbenzene, and polyfunctional (meth)acrylate-based compounds, such as 1,6-hexanediol diacrylate and trimethylolpropane triacrylate. Among these, a polyfunctional vinyl-based compound, particularly divinylbenzene, can be preferably used from the perspectives of latency and thermal responsiveness.

Note that the polyfunctional radical polymerizable compound may be formed from a polyfunctional vinyl-based compound and a polyfunctional (meth)acrylate-based compound. By such a combined use, effects such as changing thermal responsiveness and introducing a reactive functional group can be achieved.

Radical Polymerization Initiator

The radical polymerization initiator used in the present invention can initiate radical polymerization under the interfacial polymerization conditions of the polyfunctional isocyanate compound, and for example, a peroxide-based initiator or an azo-based initiator can be used.

Porous Resin

In the present invention, the porous resin is obtained by subjecting a polyfunctional isocyanate compound to interfacial polymerization and subjecting a radical polymerization compound to radical polymerization in the presence of a radical polymerization initiator, at the same time. In such a porous resin, during the interfacial polymerization, some of the isocyanate groups are hydrolyzed into amino groups. Thus, the porous resin has an aspect of being a porous polyurea which is obtained by the polymerization of a urea bond produced by the amino groups reacting with the isocyanate groups. The porous resin also has an aspect of being a two-dimensional or three-dimensional polymer, in which radicals produced by the decomposition of the radical polymerization initiator during the radical polymerization bond the unsaturated bonds in a chain like manner. Although the specific reason is not clear, when an aluminum chelate-based latent curing agent formed from a porous resin having such aspects, and an aluminum chelate-based curing agent held in the pores of the porous resin, is heated in order to cure the epoxy resin, the aluminum chelate-based curing agent held in the porous resin can come into contact with the silane coupling agent and/or the silane-based compound, such as a silanol compound, that are present outside the porous resin, so that the cationic polymerization of the epoxy resin can be initiated.

As described above, based on the structure of the aluminum chelate-based latent curing agent, it is conceived that the aluminum chelate-based curing agent is present not only in the inside but also on the surface of the aluminum chelate-based latent curing agent; however, it is conceived that the latency can be obtained since a large portion of the aluminum chelate-based curing agent present on the surface is inactivated by water present in the polymerization system during the interfacial polymerization. However, since the viscosity of the resin composition is significantly increased over time when the aluminum chelate-based latent curing agent is used in combination with an alicyclic epoxy resin having high reactivity, it is conceived that some of the aluminum chelate-based curing agent on the surface are not inactivated and maintains activity. Therefore, in the invention of the present application, the aluminum chelate-based curing agent on the surface is subjected to surface inactivation treatment with an alkoxysilane coupling agent as described below.

Alkoxysilane Coupling Agent for Surface Inactivation Treatment

The alkoxysilane coupling agent used in the surface inactivation treatment in the present invention is classified into two types as described below.

The first type is a type of silane coupling agent that produce an aluminum chelate-silanol reaction product by reacting with the active aluminum chelate-based curing agent on the surface of the aluminum chelate-based latent curing agent, thereby making the electron density of oxygen that is adjacent to aluminum atoms smaller (in other words, reducing acidity of hydrogen that is bonded to the oxygen, that is, reducing polarizability between the oxygen and the hydrogen) to reduce the activity. Examples of this type of silane coupling agent include alkoxysilane coupling agents in which an electron donating group is bonded to a silicon atom. Preferable examples thereof include alkylalkoxysilane coupling agents having an alkyl group. Specific examples thereof include methyltrimethoxysilane, n-propyltrimethoxysilane, hexyltrimethoxysilane, and the like.

The second type is a type of silane coupling agent that reduces the activity by coating the surface with epoxy polymer chains produced by reacting an epoxy group in the molecule with the active aluminum chelate-based curing agent on the surface of the aluminum chelate-based latent curing agent. Examples of this type of silane coupling agent include epoxy silane coupling agents. Specific examples thereof include 2-(3,4-epoxycyclohexyl)ethyltrimethoxysilane (KBM-303, manufactured by Shin-Etsu Chemical Co., Ltd.), 3-glycidoxypropyltrimethoxysilane (KBM-403, manufactured by Shin-Etsu Chemical Co., Ltd.), and the like.

The method of surface inactivation treatment of the aluminum chelate-based latent curing agent with an alkoxysilane coupling agent is exemplified by a method in which the aluminum chelate-based latent curing agent is immersed in a solution in which preferably from 5 to 80% (mass) of an alkoxysilane coupling agent is dissolved in an organic solvent, preferably a non-polar solvent, and particularly preferably cyclohexane, at 25 to 80° C. for 1 to 20 hours. Stirring may be performed during the immersion.

Method of Producing Aluminum Chelate-Based Latent Curing Agent

The aluminum chelate-based latent curing agent of the present invention can be produced by: obtaining an oil phase by dissolving or dispersing an aluminum chelate-based curing agent, a polyfunctional isocyanate compound, a radical polymerizable compound, and a radical polymerization initiator in a volatile organic solvent; subjecting a polyfunctional isocyanate compound to interfacial polymerization and subjecting a radical polymerizable compound to a radical polymerization reaction at the same time by adding the obtained oil phase to an aqueous phase containing a dispersing agent while being heating and stirring; and after an aluminum chelate-based curing agent is held in a porous resin obtained thereby, filtering and drying the produced particulate aluminum chelate-based latent curing agent as necessary, and then subjecting the surface thereof to inactivation treatment with an alkoxysilane coupling agent by immersing the aluminum chelate-based latent curing agent into a solution in which an alkoxysilane coupling agent is dissolved in an organic solvent. Further details will be described below.

Preparation of Oil Phase of Interfacial Polymerization

In this production method, first, an oil phase of interfacial polymerization is prepared by dissolving or dispersing an aluminum chelate-based curing agent, a polyfunctional isocyanate compound, a polyfunctional radical polymerizable compound, and a radical polymerization initiator in a volatile organic solvent. Note that the reason for using the volatile organic solvent is as follows. That is, when a high boiling point solvent having a boiling point of higher than 300° C., which is used in typical interfacial polymerization methods, is used, the organic solvent does not volatilize during the interfacial polymerization, and because of this, the contact probability of isocyanate-water is not increased, resulting in the degree of progression of the interfacial polymerization of these being insufficient. Because of this, it is difficult to obtain a polymer product having excellent shape retainability even when interfacial polymerization is performed, and even when such a polymer product is obtained, high boiling point solvents remain within the polymer product. Furthermore, in the case where the polymer product is blended into a thermosetting resin composition, the physical properties of the cured product of the thermosetting resin composition are thus negatively affected by the high boiling point solvents. Therefore, in this production method, a volatile organic solvent is preferably used as the organic solvent used during the preparation of the oil phase.

Such a volatile organic solvent is preferably a volatile organic solvent that serves as a good solvent for each of the aluminum chelate-based curing agent, the polyfunctional isocyanate compound, the polyfunctional radical polymerizable compound, and the radical polymerization initiator (solubility of each is preferably 0.1 g/mL (organic solvent) or greater), that is substantially insoluble in water (solubility in water is 0.5 g/mL (organic solvent) or less), and that has a boiling point at the atmospheric pressure of 100° C. or lower. Specific examples of such a volatile organic solvent include alcohols, acetic acid esters, ketones, and the like. Among these, ethyl acetate is preferred from the perspectives of high polarity, low boiling point, and poor water solubility.

The used amount of the volatile organic solvent is preferably from 10 to 500 parts by mass per 100 parts by mass total of the amount of the aluminum chelate-based curing agent, the polyfunctional isocyanate compound, the polyfunctional radical polymerizable compound, and the radical polymerization initiator. This is because, too small a used amount diversifies particle size and curing characteristics, and too large a used amount deteriorates curing characteristics.

Note that, by using a relatively large amount of the volatile organic solvent within the range of the used amount of the volatile organic solvent, for example, the viscosity of a solution serving as the oil phase can be decreased. Since the efficiency of stirring is enhanced when the viscosity is decreased, it is possible to make the oil phase droplet in the reaction system fine and uniform. Therefore, the particle size distribution can be made monodisperse while the particle size of the latent curing agent obtained thereby is controlled to approximately from submicron to several microns. The viscosity of the solution serving as the oil phase is preferably set to 1 to 100 mPa·s.

Furthermore, since a hydroxy group of the PVA reacts with the polyfunctional isocyanate compound in the case where PVA is used when a polyfunctional isocyanate compound or the like is emulsion-dispersed in an aqueous phase, byproducts may attach around a latent curing agent particle as foreign materials and/or the particle shape thereof may be deformed. Examples of the measures to prevent this phenomenon include promoting reactivity between the polyfunctional isocyanate compound and water, or suppressing reactivity between the polyfunctional isocyanate compound and the PVA.

To promote the reactivity between the polyfunctional isocyanate compound and water, the compounded amount of the aluminum chelate-based curing agent is preferably at most ½, more preferably at most ⅓, of the amount of the polyfunctional isocyanate compound, in terms of weight. Because of this, the contact probability of the polyfunctional isocyanate compound and water becomes high, and the polyfunctional isocyanate compound readily reacts with water before the PVA comes into contact with the surface of the oil phase droplet.

Examples of the measure to suppress the reactivity between the polyfunctional isocyanate compound and the PVA include increasing the compounded amount of the aluminum chelate-based curing agent in the oil phase. Specifically, the compounded amount of the aluminum chelate-based curing agent is preferably at least the equivalent amount of, and more preferably from 1.0 to 2.0 times, the amount of the polyfunctional isocyanate compound, in terms of weight. Because of this, the isocyanate concentration at the surface of the oil phase droplet decreases. Since the reaction (interfacial polymerization) rate of the polyfunctional isocyanate compound with amine formed by hydrolysis is greater than that of the polyfunctional isocyanate compound with a hydroxy group, the reaction probability of the polyfunctional isocyanate compound with PVA can be reduced.

When the aluminum chelate-based curing agent, the polyfunctional isocyanate compound, the polyfunctional radical polymerizable compound, and the radical polymerization initiator are dissolved or dispersed into a volatile organic solvent, these may be simply mixed and stirred at room temperature at the atmospheric pressure, or may be heated as necessary.

Performing Interfacial Polymerization and Radical Polymerization

Thereafter, in this production method, the oil phase prepared by dissolving or dispersing the aluminum chelate-based curing agent, the polyfunctional isocyanate compound, the polyfunctional radical polymerizable compound, and the radical polymerization initiator into the volatile organic solvent is added to an aqueous phase containing a dispersing agent and heated and stirred to perform the interfacial polymerization and the radical polymerization. Note that, a dispersing agent that is used in a typical interfacial polymerization method, such as polyvinyl alcohol, carboxymethyl cellulose, and gelatin, can be used as the dispersing agent. The used amount of the dispersing agent is typically from 0.1 to 10.0 mass % of the aqueous phase.

The compounded amount of the oil phase relative to the amount of the aqueous phase is preferably from 5 to 70 parts by mass per 100 parts by mass of the aqueous phase since too small an amount of the oil phase causes polydispersion and too large an amount of the oil phase causes aggregation as the result of miniaturization.

The emulsification conditions in the interfacial polymerization are, for example, conditions where heating and stirring is performed in stirring conditions such that the size of the oil phase becomes preferably from 0.5 to 100 μm (stirring apparatus: homogenizer; rate of stirring: 6000 rpm or higher), typically at atmospheric pressure at a temperature of 30 to 80° C., for a stirring time of 2 to 12 hours.

After the completion of the interfacial polymerization and the radical polymerization, the polymer microparticles are filtered and subjected to natural drying or vacuum drying to obtain the aluminum chelate-based latent curing agent. Note that the curing characteristics of the aluminum chelate-based latent curing agent can be controlled by changing the type and used amount of the polyfunctional isocyanate compound, the type and used amount of the aluminum chelate-based curing agent, the interfacial polymerization conditions, the types and the used amounts of the polyfunctional radical polymerizable compound and the radical polymerization initiator, or the radical polymerization conditions. For example, the curing temperature can be reduced by reducing the polymerization temperature. On the other hand, the curing temperature can be increased by increasing the polymerization temperature.

Surface Inactivation Treatment with Alkoxysilane Coupling Agent

In the present invention, as described above, the surface inactivation treatment is performed by immersing the obtained aluminum chelate-based latent curing agent in a solution in which preferably from 5 to 80% (mass) of an alkoxysilane coupling agent is dissolved in an organic solvent, preferably a non-polar solvent, and particularly preferably cyclohexane, at 25 to 80° C. for 1 to 20 hours. As a result, the aluminum chelate-based latent curing agent having the surface that has undergone inactivation treatment can be obtained.

Thermosetting Epoxy Resin Composition

A thermosetting epoxy resin composition that exhibits rapid curability at low temperatures can be provided by adding the aluminum chelate-based latent curing agent of the present invention to an epoxy resin and a silane-based compound. Such a thermosetting epoxy resin composition is also a part of the present invention.

Note that the content of the aluminum chelate-based latent curing agent in the thermosetting epoxy resin composition of the present invention is from 1 to 70 parts by mass, and preferably from 1 to 50 parts by mass, per 100 parts by mass of the epoxy resin since sufficient curing cannot be achieved when the content is too small, and the resin characteristics (e.g. flexibility) of the cured product of the composition deteriorate when the content is too large.

The epoxy resin constituting the thermosetting epoxy resin composition of the present invention is an epoxy resin that is used as a film forming component. In addition to alicyclic epoxy resins, glycidyl ether type epoxy resins, which could not be used conventionally in a mixed system of an aluminum chelate-based latent curing agent and a silanol compound, can be also used as such an epoxy resin. Such a glycidyl ether type epoxy resin may be in a liquid form or solid form. The glycidyl ether type epoxy resin typically has an epoxy equivalent weight of approximately 100 to 4000, and preferably has two or more epoxy groups in one molecule. Examples thereof include bisphenol A type epoxy resins, phenol novolac type epoxy resins, cresol novolac type epoxy resins, ester type epoxy resins, and the like. Among these, bisphenol A type epoxy resins can be preferably used from the perspective of resin characteristics. Furthermore, these epoxy resins include monomers and oligomers.

In addition to such a glycidyl ether type epoxy resin, the thermosetting epoxy resin composition of the present invention can use an oxetane compound together as a resin component to make the exothermic peak sharp. Examples of preferred oxetane compound include 3-ethyl-3-hydroxymethyloxetane, 1,4-bis {[(3-ethyl-3-oxetanyl)methoxy]

methyl}benzene, 4,4'-bis[(3-ethyl-3-oxetanyl)methoxymethyl]biphenyl, 1,4-benzenedicarboxylic acid bis[(3-ethyl-3-oxetanyl)]methyl ester, 3-ethyl-3-(phenoxymethyl)oxetane, 3-ethyl-3-(2-ethylhexyloxymethyl)oxetane, di[1-ethyl(3-oxetanyl)]methyl ether, 3-ethyl-3-{[3-(triethoxysilyl)propoxy]methyl}oxetane, oxetanyl silsesquioxane, phenol novolac oxetane, and the like. When an oxetane compound is used, the used amount thereof is preferably from 10 to 100 parts by mass, and more preferably from 20 to 70 parts by mass, per 100 parts by mass of the epoxy resin.

The silane-based compound compounded in the thermosetting epoxy resin composition of the present invention has a function to, together with the aluminum chelate-based curing agent held in the aluminum chelate-based latent curing agent, initiate cationic polymerization of a thermosetting resin (e.g. thermosetting epoxy resin), as described in paragraphs 0007 to 0010 of Japanese Unexamined Patent Application Publication No. 2002-212537A. Therefore, by using such a silane-based compound together, the effect of promoting the curing of the epoxy resin can be obtained. Examples of such a silane-based compound include silanol compounds with high steric hindrance, silane coupling agents having from 1 to 3 lower alkoxy group(s) in one molecule, and the like. Note that, in a molecule of the silane coupling agent, a group having reactivity to a functional group in the thermosetting resin, such as a vinyl group, a styryl group, an acryloyloxy group, a methacryloyloxy group, an epoxy group, an amino group, or a mercapto group, may be contained; however, since the latent curing agent of the present invention is a cationic curing agent, a coupling agent having an amino group or a mercapto group can be used when the amino group or the mercapto group does not substantially capture the generated cationic species.

When a silanol compound with high steric hindrance is used as a silane-based compound, the compounded amount of the silanol compound with high steric hindrance in the aluminum chelate-based latent curing agent of the present invention is preferably from 1 to 50 parts by mass, and more preferably from 1 to 30 parts by mass, per 100 parts by mass of the thermosetting resin since too small an amount causes insufficient curing and too large an amount deteriorates the resin characteristics after the curing.

The silanol compound with high steric hindrance used in the present invention is arylsilanol having a chemical structure of the following Formula (A) that is different from conventional silane coupling agents having a trialkoxy group.

(A)

In the formula, m is 2 or 3, and preferably 3; however, the sum of m and n is 4. Therefore, the silanol compound of Formula (A) is a monool or diol. "Ar" is an optionally substituted aryl group. Examples of the aryl group include a phenyl group, a naphthyl group (e.g. a 1- or 2-naphthyl group), an anthracenyl group (e.g. a 1-, 2-, or 9-anthracenyl group, or a benz[a]-9-anthracenyl group), a phenaryl group (e.g. a 3- or 9-phenaryl group), a pyrenyl group (e.g. a 1-pyrenyl group), an azulenyl group, a fluorenyl group, a biphenyl group (e.g. a 2-, 3-, or 4-biphenyl group), a thienyl group, a furyl group, a pyrrolyl group, an imidazolyl group, a pyridyl group, and the like. Among these, a phenyl group is preferred from the perspectives of ease of acquisition and acquisition cost. The "m" number of the Ar moieties may be the same or different but are preferably the same from the perspective of the ease of acquisition.

These aryl groups can have 1 to 3 substituents. Examples thereof include halogen, such as chloro and bromo; trifluoromethyl; nitro; sulfo; alkoxy carbonyl, such as carboxyl, methoxycarbonyl, and ethoxycarbonyl; electron withdrawing groups, such as formyl; alkyl, such as methyl, ethyl, and propyl; alkoxy, such as methoxy and ethoxy; hydroxy; amino; monoalkylamino, such as monomethylamino; and electron donating groups, such as dialkylamino, including dimethylamino and the like. The curing activity can be controlled since acidity of the hydroxy group of the silanol can be increased by using an electron withdrawing group as a substituent. On the other hand, the acidity can be reduced by using an electron donating group. Note that, although the substituents may differ for each of the "m" number of Ar moieties, the substituents for the "m" number of Ar moieties are preferably the same from the perspective of ease of acquisition. Furthermore, only a part of the Ar moieties may have substituent(s) while the other part of the Ar moieties do not have any substituent(s). Specific examples of the phenyl group having a substituent include a 2-, 3- or 4-methyl phenyl group; a 2,6-dimethyl-, 3,5-dimethyl-, 2,4-dimethyl-, 2,3-dimethyl-, 2,5-dimethyl-, or 3,4-dimethyl phenyl group; a 2,4,6-trimethyl phenyl group; a 2- or 4-ethyl phenyl group; and the like.

Among the silanol compound of Formula (A), preferable examples thereof include triphenylsilanol and diphenylsilanediol. Triphenylsilanol is particularly preferred.

On the other hand, when a silane coupling agent having from 1 to 3 lower alkoxy group(s) in one molecule is used as a silane-based compound, the compounded amount of the silane coupling agent in the aluminum chelate-based latent curing agent of the present invention is from 1 to 300 parts by mass, and preferably from 1 to 100 parts by mass, per 100 parts by mass of the aluminum chelate-based latent curing agent since too little an amount cannot be expected to achieve effects of such addition and too large an amount affects the polymerization termination reaction due to the silanolate anion generated by the silane coupling agent.

Specific examples of the silane coupling agent that can be used in the present invention include vinyltris(β-methoxyethoxy)silane, vinyltriethoxysilane, vinyltrimethoxysilane, γ-styryltrimethoxysilane, γ-methacryloxypropyltrimethoxysilane, γ-acryloxypropyltrimethoxysilane, β-(3,4-epoxycyclohexyl)ethyltrimethoxysilane, γ-glycidoxypropyltrimethoxysilane, γ-glycidoxypropylmethyldiethoxysilane, N-β-(aminoethyl)-γ-aminopropyltrimethoxysilane, N-β-(aminoethyl)-γ-aminopropylmethyldimethoxysilane, γ-aminopropyltriethoxysilane, N-phenyl-γ-aminopropyltrimethoxysilane, γ-mercaptopropyltrimethoxysilane, γ-chloropropyltrimethoxysilane, and the like.

Since the thermosetting epoxy resin composition of the present invention obtained as described above contains the aluminum chelate-based latent curing agent as the curing agent, the thermosetting epoxy resin composition exhibits excellent storage stability although it is one-component type. Furthermore, although a glycidyl ether-based epoxy resin, which cannot be sufficiently cured with the aluminum chelate-based latent curing agent, is contained, the thermosetting epoxy resin composition can be cationically polymerized rapidly at low temperatures since the silanol compound with high steric hindrance is contained in the thermosetting epoxy resin composition.

The aluminum chelate-based latent curing agent of the present invention may further contain fillers, such as silica and mica, pigments, antistatic agents, and the like, as necessary.

EXAMPLES

The present invention will be described specifically below.

Comparative Example 1

Production of Aluminum Chelate-Based Latent Curing Agent that had not Undergone Surface Inactivation Treatment In a 3 L interfacial polymerization vessel equipped with a thermometer, 800 parts by mass of distilled water, 0.05 parts by mass of surfactant (Newrex R-T, manufactured by NOF Corporation), and 4 parts by mass of polyvinyl alcohol (PVA-205, manufactured by Kuraray Co., Ltd.) as a dispersing agent were charged and uniformly mixed to prepare an aqueous phase.

In this aqueous phase, an oil phase formed by dissolving, in 100 parts by mass of ethyl acetate, 100 parts by mass of 24% isopropanol solution of aluminum monoacetylacetonate bis(ethylacetoacetate) (Aluminum Chelate D, manufactured by Kawaken Fine Chemicals Co., Ltd.), 70 parts by mass of trimethylolpropane (1 mol) adduct of methylenediphenyl-4,4'-diisocyanate (3 mol) (D-109, manufactured by Mitsui Chemicals, Inc.) as a polyfunctional isocyanate compound, 30 parts by mass of divinylbenzene (manufactured by Merck) as a radical polymerizable compound, and 0.3 parts by mass of radical polymerization initiator (Peroyl L, manufactured by NOF Corporation) (amount corresponding to 1 mass % of the radical polymerizable compound) was added and emulsified and mixed using a homogenizer (10000 rpm/5 min; T-50, manufactured by IKA Japan), then, interfacial polymerization and radical polymerization were performed at 80° C. for 6 hours. After the completion of the reaction, the polymerization reaction liquid was cooled to room temperature, and polymer particles were filtered out by filtration and naturally dried, thereby obtaining a spherical aluminum chelate-based latent curing agent that had not undergone surface inactivation treatment.

Example 1

Production of Aluminum Chelate-Based Latent Curing Agent that had Undergone Surface Inactivation Treatment A surface inactivation treatment liquid was prepared by dissolving 1.5 parts by mass of methyltrimethoxysilane (KBM-13, manufactured by Shin-Etsu Chemical Co., Ltd.) in 28.5 parts by mass of cyclohexane. To 30 parts by mass of this treatment liquid, 3 parts by mass of the aluminum chelate-based latent curing agent of Comparative Example 1, which had not undergone surface inactivation treatment, was added and this mixture was stirred at 200 rpm at 30° C. for 20 hours to perform surface inactivation treatment of the aluminum chelate-based latent curing agent. After the completion of the treatment reaction, polymer particles were filtered out from the treatment liquid by filtration and naturally dried, thereby obtaining a spherical aluminum chelate-based latent curing agent that had undergone surface inactivation treatment.

Example 2

A surface inactivation treatment liquid was prepared by dissolving 3 parts by mass of methyltrimethoxysilane (KBM-13, manufactured by Shin-Etsu Chemical Co., Ltd.) in 27 parts by mass of cyclohexane. To 30 parts by mass of this treatment liquid, 3 parts by mass of the aluminum chelate-based latent curing agent of Comparative Example 1, which had not undergone surface inactivation treatment, was added and the mixture was stirred at 200 rpm at 30° C. for 20 hours to perform surface inactivation treatment of the aluminum chelate-based latent curing agent. After the completion of the treatment reaction, polymer particles were filtered out from the treatment liquid by filtration and naturally dried, thereby obtaining a spherical aluminum chelate-based latent curing agent that had undergone surface inactivation treatment.

Example 3

A spherical aluminum chelate-based latent curing agent that had undergone surface inactivation treatment was obtained by performing the operation similar to that of Example 2 except for using 3 parts by mass of n-propyltrimethoxysilane (KBM-3033, manufactured by Shin-Etsu Chemical Co., Ltd.) in place of 3 parts by mass of methyltrimethoxysilane (KBM-13, manufactured by Shin-Etsu Chemical Co., Ltd.).

Example 4

A spherical aluminum chelate-based latent curing agent that had undergone surface inactivation treatment was obtained by performing the operation similar to that of Example 2 except for using 3 parts by mass of hexyltrimethoxysilane (KBM-3063, manufactured by Shin-Etsu Chemical Co., Ltd.) in place of 3 parts by mass of methyltrimethoxysilane (KBM-13, manufactured by Shin-Etsu Chemical Co., Ltd.).

Comparative Example 2

Production of Aluminum Chelate-Based Latent Curing Agent that had not Undergone Surface Inactivation Treatment In a 3 L interfacial polymerization vessel equipped with a thermometer, 800 parts by mass of distilled water, 0.05 parts by mass of surfactant (Newrex R-T, manufactured by NOF Corporation), and 4 parts by mass of polyvinyl alcohol (PVA-205, manufactured by Kuraray Co., Ltd.) as a dispersing agent were charged and uniformly mixed to prepare an aqueous phase.

In this aqueous phase, an oil phase formed by dissolving, in 70 parts by mass of ethyl acetate, 350 parts by mass of 24% isopropanol solution of aluminum monoacetylacetonate bis(ethylacetoacetate) (Aluminum Chelate D, manufactured by Kawaken Fine Chemicals Co., Ltd.), 49 parts by mass of trimethylolpropane (1 mol) adduct of methylenediphenyl-4,4'-diisocyanate (3 mol) (D-109, manufactured by Mitsui Chemicals, Inc.) as a polyfunctional isocyanate compound, 21 parts by mass of divinylbenzene (manufactured by Merck) as a radical polymerizable compound, and 0.21 parts by mass of radical polymerization initiator (Peroyl L, manufactured by NOF Corporation) (amount corresponding to 1 mass % of the radical polymerizable compound) was added and emulsified and mixed using a homogenizer (10000 rpm/5 min; T-50, manufactured by IKA Japan), then, interfacial polymerization and radical polymerization were performed at 80° C. for 6 hours. After the completion of the reaction, the polymerization reaction liquid was cooled to room temperature, and polymer particles were filtered out by filtration and naturally dried, thereby obtaining a spherical particulate aluminum chelate-based latent curing agent that had not undergone surface inactivation treatment.

This aluminum chelate-based latent curing agent was added to an impregnating liquid formed from 40 parts by mass of 24% isopropanol solution of aluminum monoacetylacetonate bis(ethylacetoacetate) (Aluminum Chelate D, manufactured by Kawaken Fine Chemicals Co., Ltd.) and 60 parts by mass of ethanol, and stirred at 30° C. for 6 hours. Thereafter, the particulate curing agent was filtered out and naturally dried to obtain a highly concentrated, spherical aluminum chelate-based latent curing agent that had not undergone surface inactivation treatment.

Example 5

A surface inactivation treatment liquid was prepared by dissolving 3 parts by mass of n-propyltrimethoxysilane (KBM-3033, manufactured by Shin-Etsu Chemical Co., Ltd.) in 27 parts by mass of cyclohexane. To 30 parts by mass of this treatment liquid, 3 parts by mass of the aluminum chelate-based latent curing agent of Comparative Example 2, which had not undergone surface inactivation treatment, was added and this mixture stirred at 200 rpm at 30° C. for 20 hours to perform surface inactivation treatment of the aluminum chelate-based latent curing agent. After the completion of the treatment reaction, polymer particles were filtered out from the treatment liquid by filtration and naturally dried, thereby obtaining a highly concentrated, spherical aluminum chelate-based latent curing agent that had undergone surface inactivation treatment.

Example 6

A surface inactivation treatment liquid was prepared by dissolving 6 parts by mass of n-propyltrimethoxysilane (KBM-3033, manufactured by Shin-Etsu Chemical Co., Ltd.) in 24 parts by mass of cyclohexane. To 30 parts by mass of this treatment liquid, 3 parts by mass of the aluminum chelate-based latent curing agent of Comparative Example 2, which had not undergone surface inactivation treatment, was added and this mixture stirred at 200 rpm at 30° C. for 20 hours to perform surface inactivation treatment of the aluminum chelate-based latent curing agent. After the completion of the treatment reaction, polymer particles were filtered out from the treatment liquid by filtration and naturally dried, thereby obtaining a highly concentrated, spherical aluminum chelate-based latent curing agent that had undergone surface inactivation treatment.

Example 7

A surface inactivation treatment liquid was prepared by dissolving 6 parts by mass of 2-(3,4-epoxycyclohexyl)ethyltrimethoxysilane (KBM-303, manufactured by Shin-Etsu Chemical Co., Ltd.) in 24 parts by mass of cyclohexane. To 30 parts by mass of this treatment liquid, 3 parts by mass of the aluminum chelate-based latent curing agent of Comparative Example 2, which had not undergone surface inactivation treatment, was added and this mixture was stirred at 200 rpm at 30° C. for 20 hours to perform surface inactivation treatment of the aluminum chelate-based latent curing agent. After the completion of the treatment reaction, polymer particles were filtered out from the treatment liquid by filtration and naturally dried, thereby obtaining a highly concentrated, spherical aluminum chelate-based latent curing agent that had undergone surface inactivation treatment.

Evaluation 1 (DSC Measurement)

Thermosetting epoxy resin compositions for DSC measurements were obtained by uniformly mixing 8 parts by mass of the aluminum chelate-based latent curing agent of Comparative Examples 1 and 2 and Examples 1 to 7, 80 parts by mass of bisphenol A type epoxy resin (EP828, manufactured by Mitsubishi Chemical Corporation), and 4 parts by mass of triphenylsilanol (manufactured by Tokyo Chemical Industry Co., Ltd.).

Figure 2:
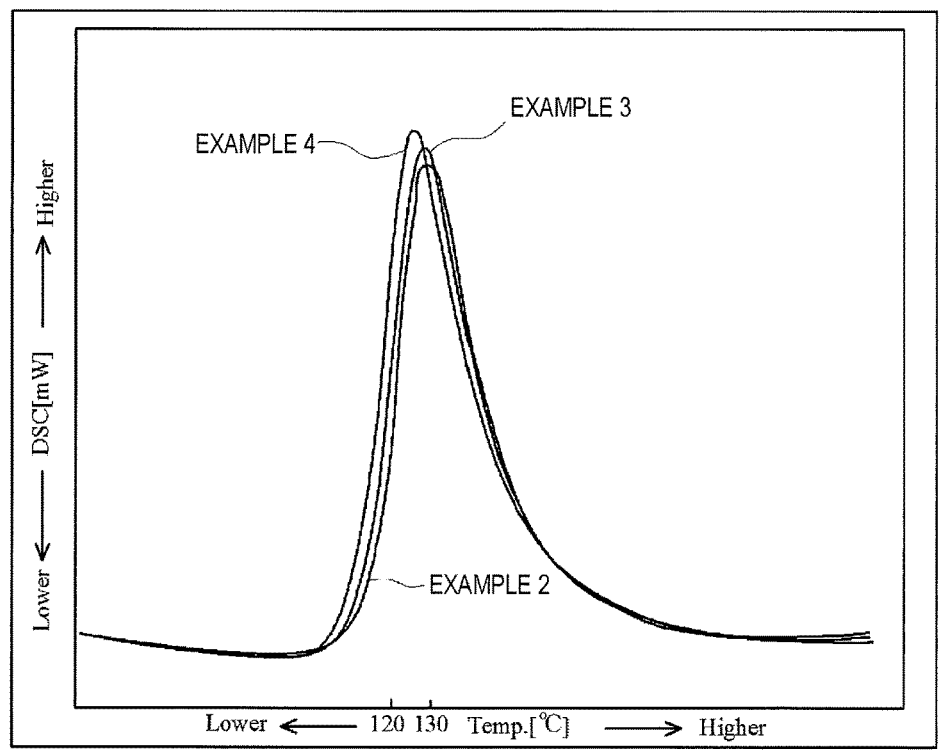
FIG. 2 is a DSC chart of thermosetting epoxy resin compositions containing the aluminum chelate-based latent curing agents of Examples 2 to 4.
Figure 3:
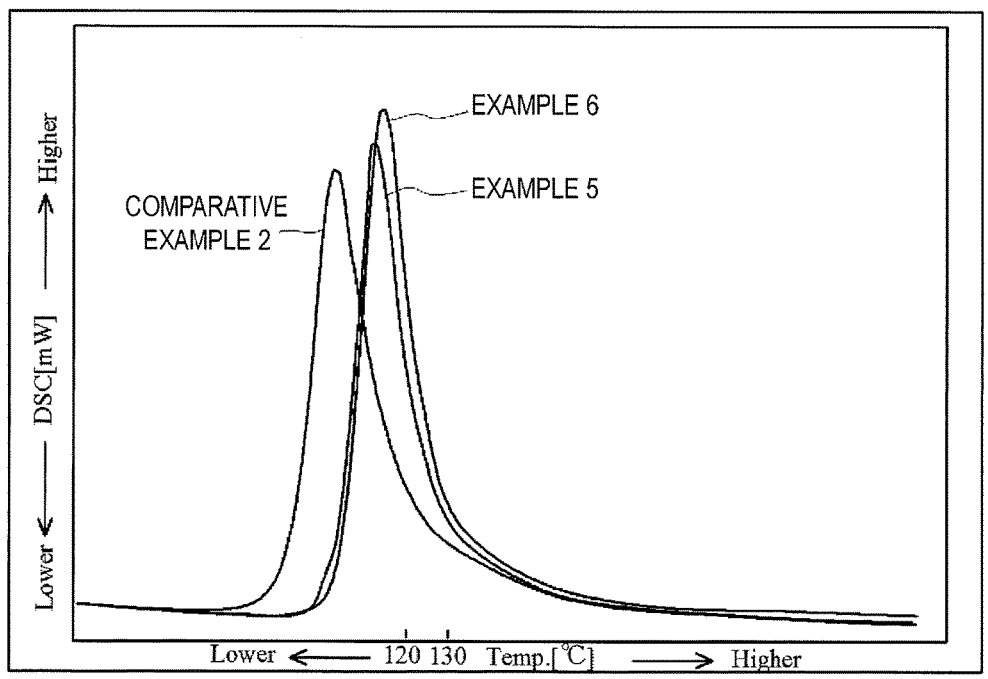
FIG. 3 is a DSC chart of thermosetting epoxy resin compositions containing the aluminum chelate-based latent curing agents of Comparative Example 2 and Examples 5 and 6.
Figure 4:
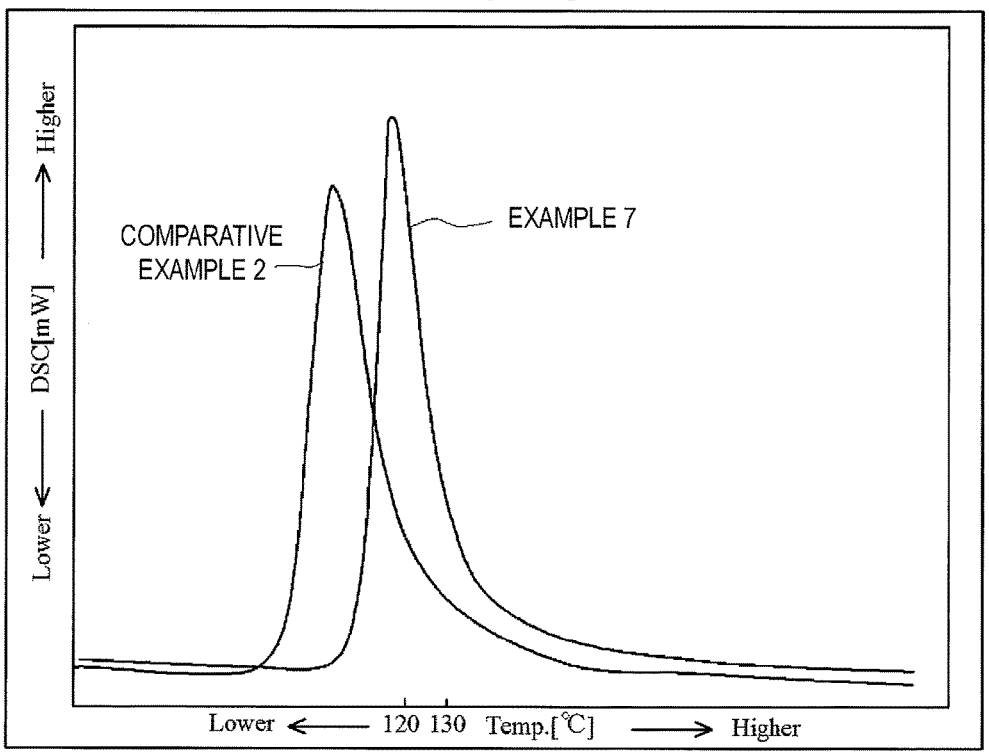
FIG. 4 is a DSC chart of thermosetting epoxy resin compositions containing the aluminum chelate-based latent curing agents of Comparative Example 2 and Example 7.

These thermosetting epoxy resin compositions were subjected to thermal analysis using a differential thermal analyzer (DSC6200, manufactured by Hitachi High-Tech Science Corporation). The obtained results are shown in Table 1. Furthermore, the results of the thermosetting epoxy resin compositions, in which the aluminum chelate-based latent curing agents of Examples 1 and 2 and Comparative Example 1 were used, are shown in FIG. 1. The results of the thermosetting epoxy resin compositions, in which the aluminum chelate-based latent curing agents of Examples 2 to 4 were used, are shown in FIG. 2. The results of the thermosetting epoxy resin compositions, in which the aluminum chelate-based latent curing agents of Comparative Example 2 and Examples 5 and 6 were used, are shown in FIG. 3. The results of the thermosetting epoxy resin compositions, in which the aluminum chelate-based latent curing agents of Comparative Example 2 and Example 7 were used, are shown in FIG. 4. Note that, regarding the curing characteristics of the aluminum chelate-based latent curing agent, the heat generation starting temperature indicates curing starting temperature. The exothermic peak temperature indicates the temperature at which the curing is most active. The gross heating value (peak area) indicates the degree of progression of curing, and practically, the gross heating value of 250 J/g or greater is desired to achieve excellent rapid curability at low temperatures.

Evaluation 2 (Storage Stability)

Thermosetting epoxy resin compositions for viscosity measurements were obtained by uniformly mixing 2 parts by mass of the aluminum chelate-based latent curing agents of Comparative Examples 1 and 2 and Examples 1 to 7, 100 parts by mass of alicyclic epoxy resin (CEL2021P, manufactured by Daicel Corporation), 0.5 parts by mass of 3-glycidoxypropyltrimethoxysilane (KBM-403, manufactured by Shin-Etsu Chemical Co., Ltd.), and 7 parts by mass of triphenylsilanol (manufactured by Tokyo Chemical Industry Co., Ltd.).

These thermosetting epoxy resin compositions were stored at room temperature (25° C.). The initial viscosity and viscosity after predetermined time has passed were measured using a Tuning Fork Vibro Viscometer (SV-10, manufactured by A&D Company, Limited) at 20° C. The obtained results are shown in Table 2. The value obtained by dividing the viscosity after 48 hours by the initial viscosity (48 H value/initial value) is also shown in Table 1. The value closer to 1 indicates superior storage stability.

Evaluation 3 (Electron Microscope Observation)

Figure 5:
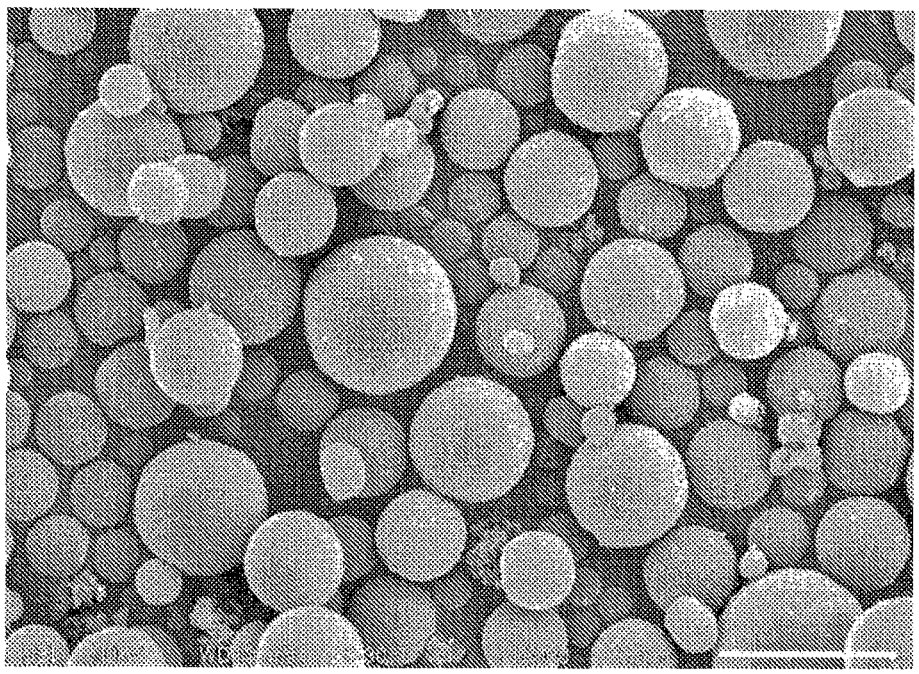
FIG. 5 is an electron micrograph (magnification: ×5000) of the aluminum chelate-based latent curing agent of Example 6.
Figure 6:
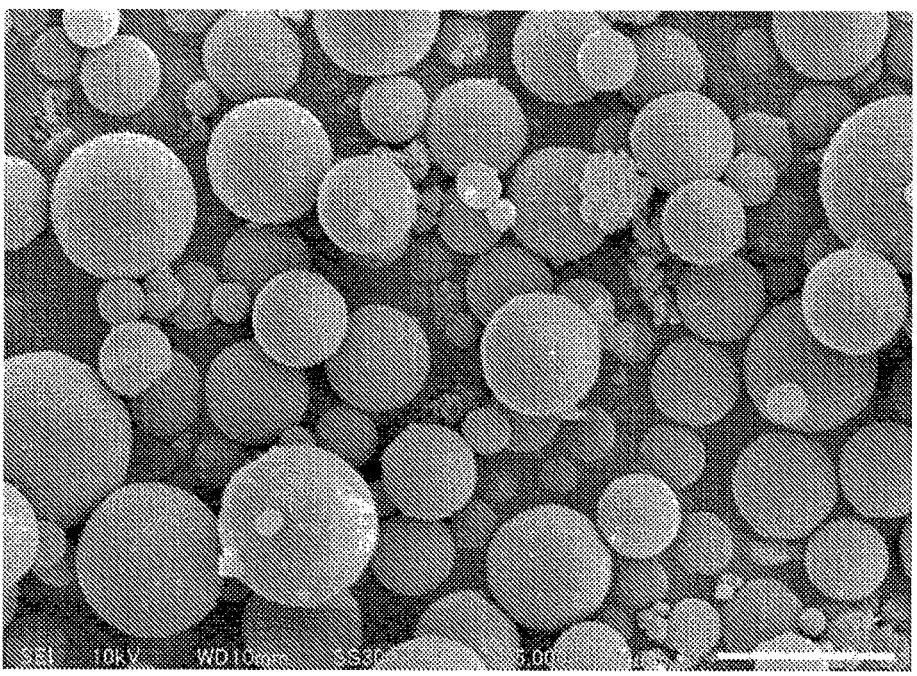
FIG. 6 is an electron micrograph (magnification: ×5000) of the aluminum chelate-based latent curing agent of Example 7.

Electron micrographs (magnification: ×5000) of the aluminum chelate-based latent curing agents of Examples 6 and 7 are shown in FIGS. 5 and 6, respectively.

TABLE 1

| | | Comparative Example | Examples | | | | Comparative Example | Examples | | |
|---|---|---|---|---|---|---|---|---|---|---|
| | | 1 | 1 | 2 | 3 | 4 | 2 | 5 | 6 | 7 |
| Surface inactivation treatment agent Compounded amount per 3 parts by mass of latent curing agent (part by mass) | Methyltrimethoxysilane | | 1.5 | 3 | | | | | | |
| | N-propyltrimethoxysilane | | | | 3 | | | 3 | 6 | |
| | Hexyltrimethoxysilane | | | | | 3 | | | | |
| | 2-(3,4-Epoxycyclohexyl) ethyltrimethoxysilane | | | | | | | | | 6 |
| Evaluation 1 (DSC measurement) | Heat generation starting temperature (° C.) | 85.4 | 96.6 | 99.9 | 100.5 | 100 | 80 | 91.3 | 94 | 100.3 |
| | Exothermic peak temperature (° C.) | 121.8 | 129.5 | 129.7 | 128.4 | 125.5 | 102.9 | 112.2 | 114 | 116.6 |
| | Gross heating value (mW) | 293 | 289 | 287 | 303 | 310 | 388 | 351 | 367 | 350 |
| Evaluation 2 (storage stability) | 48 H value/initial value | — | 1.54 | 1.22 | 1.16 | 1.21 | — | 2.42 | 1.21 | 1.02 |

TABLE 2

| | Viscosity (cP) | | | | | | Storage stability |
|---|---|---|---|---|---|---|---|
| | Initial | After 1 hr | After 3 hr | After 6 hr | After 24 hr | After 48 hr | 48 H/ initial |
| Comparative Example 1 | 1316 | 2069 | 5493 | Out of range | | | — |
| Example 1 | 636 | 644 | 723 | 748 | 869 | 982 | 1.54 |
| Example 2 | 658 | 671 | 691 | 692 | 743 | 801 | 1.22 |
| Example 3 | 656 | 677 | 685 | 691 | 756 | 762 | 1.16 |
| Example 4 | 654 | 660 | 663 | 687 | 755 | 789 | 1.21 |
| Comparative Example 2 | 6870 | 11473 | | Out of range | | | — |
| Example 5 | 652 | 668 | 773 | 758 | 1119 | 1579 | 2.42 |
| Example 6 | 651 | 659 | 685 | 691 | 743 | 788 | 1.21 |
| Example 7 | 600 | 602 | 607 | 608 | 609 | 611 | 1.02 |

Discussion of Results (1) As is clear from the results of Comparative Example 1 and Examples 1 and 2 shown in Table 1, Table 2, and FIG. 1, when the surface inactivation treatment was performed with alkylalkoxysilane, practical rapid curability at low temperatures and latency were ensured although the heat generation starting temperature and the exothermic peak temperature were shifted to high temperature side. Furthermore, as is clear from the results of storage stability, the storage stability at room temperature of the one-component thermosetting epoxy resin composition of highly reactive alicyclic epoxy resin system was significantly enhanced.

(2) As is clear from the results of Examples 2 to 4 shown in Table 1, Table 2, and FIG. 2, similar results were obtained even when the type of the alkylalkoxysilane was changed.

(3) As is clear from the results of Comparative Example 2 and Examples 5 and 6 shown in Table 1, Table 2, and FIG. 3, even when the highly concentrated aluminum chelate-based latent curing agent was used, practical rapid curability at low temperatures and latency were ensured if the surface inactivation treatment was performed with the alkylalkoxysilane. Furthermore, it was also found that the storage stability at room temperature of the one-component thermosetting epoxy resin composition of highly reactive alicyclic epoxy resin system was significantly enhanced.

(4) As is clear from the results of Comparative Example 2 and Example 7 shown in Table 1, Table 2, and FIG. 4, even when the highly concentrated aluminum chelate-based latent curing agent was used, practical rapid curability at low temperatures and latency were ensured if the surface inactivation treatment was performed with the epoxyalkoxysilane. Furthermore, it was also found that the storage stability at room temperature of the one-component thermosetting epoxy resin composition of highly reactive alicyclic epoxy resin system was significantly enhanced.

From the electron micrographs (FIG. 5 and FIG. 6) of the aluminum chelate-based latent curing agents of Examples 6 and 7, it was found that the shape of the curing agent particles was substantially spherical. From these, it is presumed that the surface of the aluminum chelate-based latent curing agent particle was uniformly coated with the coupling agent treatment film described above.

INDUSTRIAL APPLICABILITY

The aluminum chelate-based latent curing agent of the present invention exhibits sharp thermal responsiveness at low temperature regions although the interfacial polymerization product of polyfunctional isocyanate compound is used as the microcapsule wall. Therefore, the aluminum chelate-based latent curing agent of the present invention is useful as a latent curing agent of epoxy-based adhesive agent for bonding at a low temperature in a short period of time.

The invention claimed is:

1. An aluminum chelate-based latent curing agent for curing a thermosetting epoxy resin,
    an aluminum chelate-based curing agent being held in a porous resin obtained by, at the same time, subjecting a polyfunctional isocyanate compound to interfacial polymerization and subjecting a radical polymerizable compound to radical polymerization in the presence of a radical polymerization initiator, and
    a surface of the aluminum chelate-based latent curing agent having been subjected to inactivation treatment with an alkoxysilane coupling agent.

2. The aluminum chelate-based latent curing agent according to claim 1, wherein the alkoxysilane coupling agent is an alkylalkoxysilane.

3. The aluminum chelate-based latent curing agent according to claim 2, wherein the alkylalkoxysilane is methyltrimethoxysilane, n-propyltrimethoxysilane, or hexyltrimethoxysilane.

4. The aluminum chelate-based latent curing agent according to claim 1, wherein the alkoxysilane coupling agent is an epoxyalkoxysilane.

5. The aluminum chelate-based latent curing agent according to claim 4, wherein the epoxyalkoxysilane is 2-(3,4-epoxycyclohexyl)ethyltrimethoxysilane or 3-glycidoxypropyltrimethoxysilane.

6. The aluminum chelate-based latent curing agent according to claim 1, wherein the radical polymerizable compound contains a polyfunctional radical polymerizable compound.

7. The aluminum chelate-based latent curing agent according to claim 6, wherein the radical polymerizable compound contains not less than 50 mass % of the polyfunctional radical polymerizable compound.

8. The aluminum chelate-based latent curing agent according to claim 6, wherein the polyfunctional radical polymerizable compound is a polyfunctional vinyl-based compound.

9. The aluminum chelate-based latent curing agent according to claim 8, wherein the polyfunctional vinyl-based compound is divinylbenzene.

10. The aluminum chelate-based latent curing agent according to claim 6, wherein the polyfunctional radical polymerizable compound further contains a polyfunctional (meth)acrylate-based compound.

11. The aluminum chelate-based latent curing agent according to claim 1, wherein a content of the aluminum chelate-based curing agent is from 10 to 200 parts by mass per 100 parts by mass total of the polyfunctional isocyanate compound and the radical polymerizable compound.

12. A method of producing the aluminum chelate-based latent curing agent described in claim 1, the method comprising:
   obtaining an oil phase by dissolving or dispersing an aluminum chelate-based curing agent, a polyfunctional isocyanate compound, a radical polymerizable compound, and a radical polymerization initiator in a volatile organic solvent;
   subjecting a polyfunctional isocyanate compound to interfacial polymerization and subjecting a radical polymerizable compound to a radical polymerization reaction at the same time by adding the obtained oil phase to an aqueous phase containing a dispersing agent while heating and stirring; and
   after an aluminum chelate-based curing agent is held in a porous resin obtained thereby, subjecting a surface of the aluminum chelate-based latent curing agent to inactivation treatment with an alkoxysilane coupling agent by immersing the aluminum chelate-based latent curing agent into a solution in which an alkoxysilane coupling agent is dissolved in an organic solvent.

13. A thermosetting epoxy resin composition comprising the aluminum chelate-based latent curing agent described in claim 1, an epoxy resin, and a silane-based compound.

14. The thermosetting epoxy resin composition according to claim 13, wherein the silane-based compound is triphenylsilanol.

* * * * *